United States Patent
Ayzenberg et al.

(10) Patent No.: US 11,210,319 B2
(45) Date of Patent: Dec. 28, 2021

(54) REPLICATION PROGRESS FOR UPIT SNAPSHOTS

(71) Applicant: EMC IP Holding Company LLC, Hopkinton, MA (US)

(72) Inventors: Lev Ayzenberg, Petakh-Tikwa (IL); Zion Drori, Herzliya (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 354 days.

(21) Appl. No.: 16/456,829

(22) Filed: Jun. 28, 2019

(65) Prior Publication Data
US 2020/0409974 A1 Dec. 31, 2020

(51) Int. Cl.
*G06F 16/27* (2019.01)
*G06F 16/23* (2019.01)
*G06F 16/22* (2019.01)

(52) U.S. Cl.
CPC .......... *G06F 16/27* (2019.01); *G06F 16/2246* (2019.01); *G06F 16/2379* (2019.01)

(58) Field of Classification Search
CPC ... G06F 16/27; G06F 16/2379; G06F 16/2246
See application file for complete search history.

(56) References Cited

U.S. PATENT DOCUMENTS

| | | | |
|---|---|---|---|
| 8,135,930 B1 * | 3/2012 | Mattox | G06F 3/067 711/162 |
| 8,655,848 B1 * | 2/2014 | Leverett | G06F 16/1844 707/660 |
| 2006/0106893 A1 * | 5/2006 | Daniels | G06F 11/1435 |
| 2012/0310894 A1 * | 12/2012 | Freedman | G06F 11/1402 707/674 |
| 2016/0179919 A1 * | 6/2016 | Martin | G06F 16/242 707/602 |
| 2019/0065322 A1 * | 2/2019 | Chakankar | G06F 3/0619 |
| 2020/0042396 A1 * | 2/2020 | Desai | G06F 11/1464 |
| 2020/0065399 A1 * | 2/2020 | Desai | G06F 16/2246 |

* cited by examiner

*Primary Examiner* — Mohsen Almani
(74) *Attorney, Agent, or Firm* — Womble Bond Dickinson (US) LLP

(57) ABSTRACT

A method for storing progress data while replicating a snapshot is disclosed. The operations comprise: determining blocks in a storage object that are different between a first and a second snapshots, wherein the first snapshot corresponds to a first tree structure, and the second snapshot corresponds to a second tree structure; and replicating the second snapshot to a remote storage system, comprising replicating all the blocks in the storage object determined to be different between the first and the second snapshots, wherein the replicating further comprises: upon completion of replication of each data slice, determining nodes in the first tree structure that reference only already-replicated blocks; orphaning all such nodes in the first tree structure; and subsequently, updating the first tree structure, comprising merging the first tree structure and the second tree structure, wherein the first tree structure is updated upon completion of replication of each data slice.

21 Claims, 9 Drawing Sheets

REPLICATION PROGRESS FOR UPIT SNAPSHOTS

FIELD OF THE INVENTION

Embodiments of the present invention relate generally to data storage systems. More particularly, embodiments of the invention relate to storing progress information during a replication process.

BACKGROUND

The Virtual Storage Area Network (VSAN) remote protection service manages replication cycle progress information. This information is needed to avoid re-replication of same data in case of an interruption in the middle of a replication cycle.

The replication progress data includes a relatively large amount of data, and is a part of the data evaluation pipeline. Therefore, the replication progress data is different from other information saved by VSAN Data Protection (VSAN-DP) persistency services, as all the other information saved describes the Consistency Group (CG)/Virtual Machine (VM) structure and replication policy, which is relatively small in size and is never updated in the middle of replication cycle.

Therefore, the requirement to store progress data imposes additional performance and scale requirements on the replication persistency service. For example, one of the persistence models considered for VSAN DP involves saving the CG structure information in replication object attributes of the internal database known as Cluster Monitoring, Membership, and Directory Service (CMMDS) of the VSAN storage. None of the existing persistency models can provide a progress data container.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
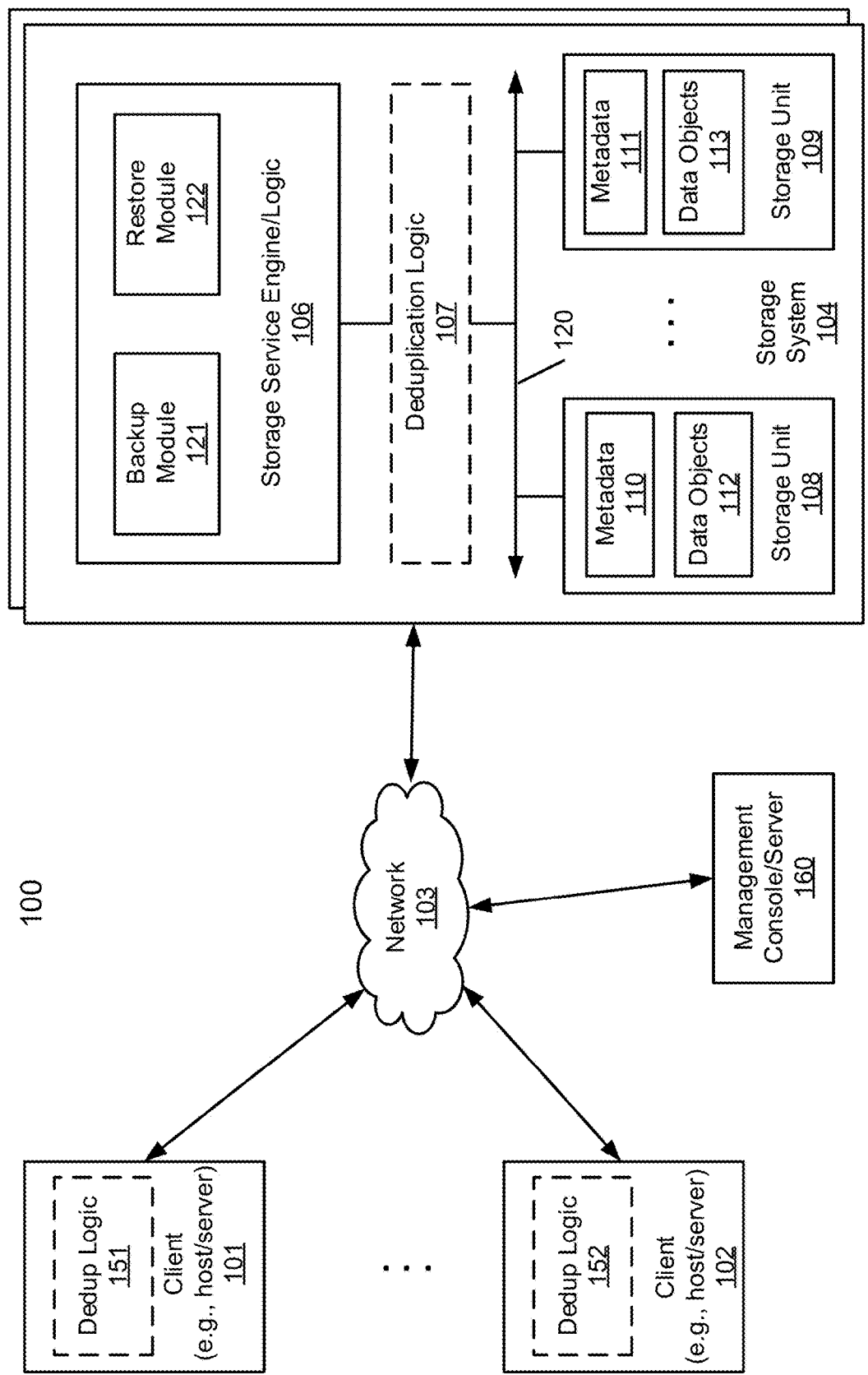
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure relate to a method, apparatus, and system for managing the replication progress information persistently using the native Universal Point in Time (UPIT) structure. UPIT is a snapshot technology developed by VMware, Inc. No change in the UPIT internal implementation or persistency model is required.

Embodiments of the disclosure relate to a method, apparatus, and system for storing progress data while replicating a snapshot. The operations comprise: determining blocks in a storage object that are different between a first and a second snapshots, wherein the first snapshot corresponds to a first tree structure referencing blocks in the storage object, and the second snapshot corresponds to a second tree structure referencing blocks in the storage object; and replicating the second snapshot to a remote storage system, comprising replicating all the blocks in the storage object determined to be different between the first and the second snapshots, wherein the replicating further comprises: upon completion of replication of each data slice of a predetermined size, determining nodes in the first tree structure that reference only already-replicated blocks; orphaning all the nodes in the first tree structure that reference only the already-replicated blocks; and subsequent to node orphaning, updating the first tree structure, comprising merging the first tree structure and the second tree structure, wherein the first tree structure is updated upon completion of replication of each data slice.

In one embodiment, subsequent to an interruption to the replicating, the replicating is resumed, wherein resuming the replicating further comprises: determining blocks in the storage object that are different between an updated first snapshot and the second snapshot, the updated first snapshot corresponding to the updated first tree structure; and replicating all the blocks in the storage object determined to be different between the updated first snapshot and the second snapshot, wherein the first tree structure is updated upon completion of replication of each data slice.

In one embodiment, the first and second tree structures are Universal Point in Time (UPIT) B+ trees.

In one embodiment, the first snapshot was replicated in a previous replication cycle. In another embodiment, the first snapshot corresponds to a fully unallocated storage object.

In one embodiment, the storage object is a Virtual Storage Area Network (VSAN) object, and the remote storage system is a remote VSAN cluster.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

A replicator replicates an original file system on a replicated file system. The replicated file system can be accessed by both the replicator and clients. To perform file replication, the replicator may create, delete or modify files on the replicated file system. In some embodiments, clients can read files on the replicated file system, but may not create, delete or modify files. In some embodiments, the replicator duplicates the replicated file system based on the original file system during initialization. In some embodiments, to efficiently initialize the replicated file system, the original file system is copied to the replicated file system via a network connection or using removable storage media such as backup tapes or optical storage discs.

In some embodiments, data segments included in the original file system are copied to the replicated file system via removable storage media and initialization is completed via the network. The replicator updates changes to the original file system on the replicated file system, keeping the two file systems synchronized. The replicator may be implemented as a process and/or device separate from the storage systems and/or file systems, a process and/or device that is a part of one or both of the storage systems and/or file system, or any other appropriate means. For example, in some embodiments, the replicator is a standalone device capable of communicating with the file systems. It determines the necessary updates by communicating with the original file system, and sends the updates to the replicated file system. The replicated file system is configured to answer queries, accept the updates, and modify the contents in the file system accordingly. In some embodiments, the replicator's functions are implemented as separate processes on the storage systems.

It is possible to represent files in other ways, such as using a mixture of byte sequences and references to byte sequences in other files. The byte sequences are treated as data segment. The identifiers used to reference the segments are substantially shorter than the segments themselves. Therefore, using identifiers allows more efficient use of available storage space. In some embodiments, the data segments and data segment identifiers are replicated on the replicated file system. In some embodiments, metadata of files are also updated. As used herein, metadata includes data associated with various attributes of the file, such as file name, file length, date stamp, permission, whether a file has been removed from the current file system, whether a file has been renamed, etc.

In some embodiment, only the files that have been updated or newly references are replicated. A file is deemed to have been updated if it has been modified in some way since the last replication, such as having been edited, created, renamed, deleted, had a permission change, etc. If the file has not been updated, nothing needs to be done to it in terms of replication. Any data segment that has been previously stored on the replicated file system, but is newly referenced by the file being processed is located. In some embodiments, a data segment is deemed to be newly referenced if it was not referenced by the file at the time of the last replication, as a data segment that has been added or modified since the last replication.

In some embodiments, a data segment is deemed to be newly referenced if it was never referenced by the file during the file's replication history, or was not referenced within some number of replications. A data segment may be previously stored on the replicated file system, but is still newly referenced by the file if the data segment was previously stored on the replicated file system by another file, by a client writing to the replicated file system, or by some other preloading/initialization mechanism. Since the data segments have been previously stored, they do not need to be replicated again on the replicated file system. Thus, greater efficiency in replication is achieved, especially in file systems where multiple files share a large amount of identical data. How to locate these previously stored data segments are discussed in more detail below. Further, data segments that have not been previously stored on the replicated file system are located and replicated on the replicated file system. It is possible in some situations that all the data segments included in the file have been previously stored on the replicated file system therefore no additional replication is necessary. It is also possible that there is no previously stored data segment and all the data segments in the file need to be replicated.

In some embodiments, a log record is used to track the file system operations, recording file updates as they occur. Depending on implementation, the entries in the log record may include segment references, content handles, metadata, and other information that can be used for executing operations to synchronize the replicated file system with the original file system. There are a number of ways a log entry is generated, including every time an event (such as file write) occurs, after several events occur, or at a predetermined frequency. In some embodiments, to capture more update information with fewer log entries, each log entry is generated only when a key event occurs, such as when a file closes, after a predetermined idle period has lapsed, when a snapshot of the file system is created, etc. During replication, the log record is processed, and updated files are determined based on log entries indicating file update operations such as file modification, file creation, etc.

In some embodiments, a snapshot is taken immediately before a replication starts. The snapshot records information of the file system at a point in time. It may be a snapshot of the entire file system, or a snapshot of one or more individual files. The snapshot may include information such as data segment references, content handles, etc. In some embodiments, prior to the next replication operation, the current states of the system are compared to a snapshot of the system to determine which files have been updated. In some embodiments, the current states of a file are compared to a snapshot of the file to determine whether the file has been updated.

In processing data segments, there are a number of ways to locate data segments that have not been stored previously on the replicated file system, some of which are described below although any other appropriate technique may be used. In some embodiments, log records are used. Log entries record operations on the original file system. In some embodiments, when a file is updated, a log entry including information about the file's data segment references is created. Offsets of the new data segment references, and other information that may assist in file replication are also recorded as appropriate. During replication, based on the log records of the new data segment references, it is determined whether the data segment being referenced has been stored already.

In some embodiments, upon receiving a query, the data segment reference on the replicated file system is looked up by the replicator or the replicated file system in a database of stored data segment identifiers, to determine whether such a data segment has been stored previously, and provides a response based on the lookup result. In some embodiments, the data segment reference under evaluation is compared with the data segment references known at the time of last replication. The comparison can be carried out by the original file system or by the replicator. If the data segment reference can be found in existing data segment references, it indicates that the corresponding data segment has already been stored. Else, the corresponding data segment may not have been stored and may need to be replicated. In some embodiments, all such segments are replicated. In other embodiments, a query of the replicator or replicated file system determines whether the segment is replicated or not as described above. In all cases, many segments are not replicated even though new references to those segments are. Thus, the available bandwidth of the storage systems and the network connecting them is more efficiently utilized.

In some embodiments, when a file is updated, a log entry including information about the file's content handle is created. In some embodiments, to reduce the amount of processing, a log entry including content handle information is created after multiple updates, or upon certain key event such as when a file is closed. The content handle indirectly references the data segments included in the file and may be analyzed to obtain data segment references.

Figure 2:
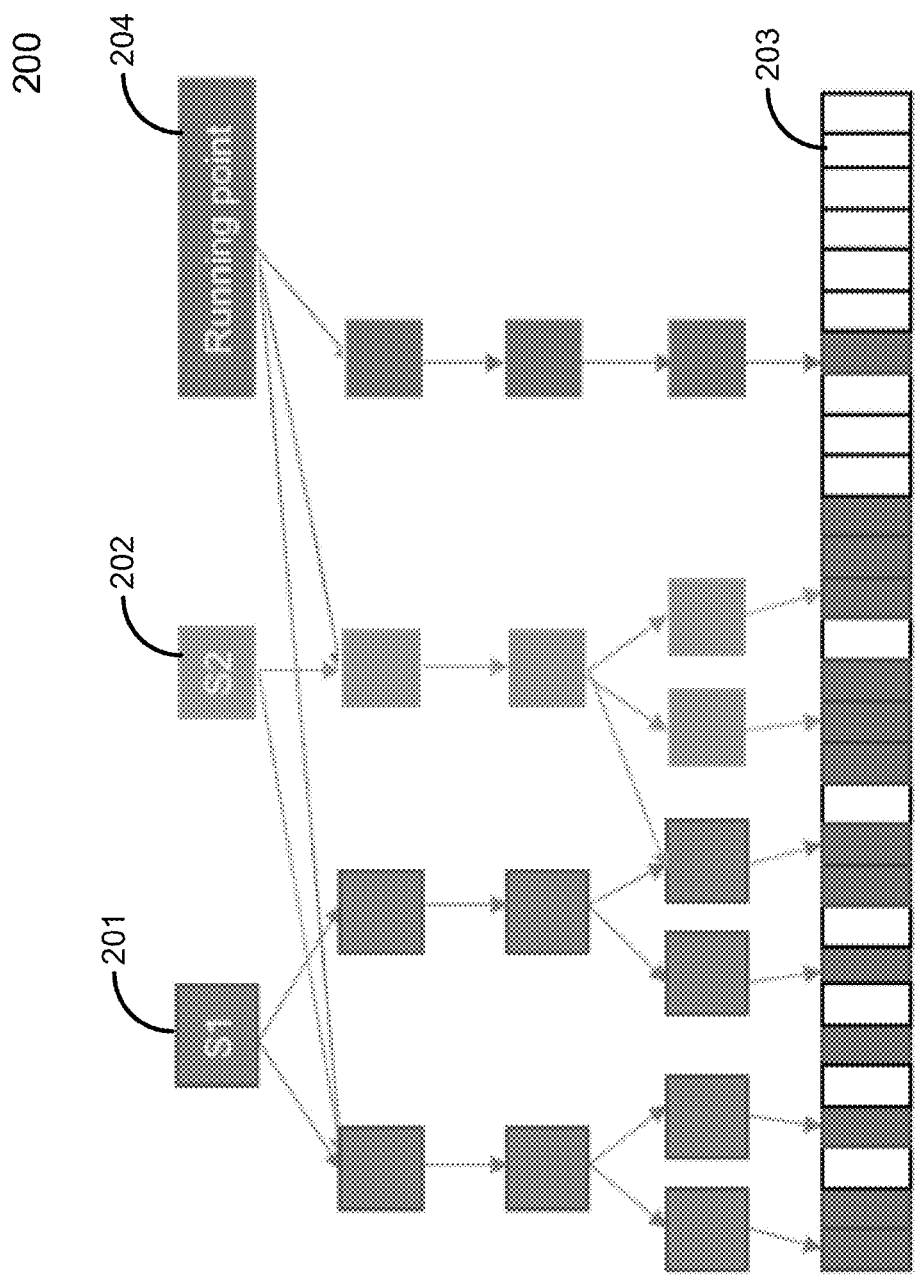
FIG. 2 is an example diagram illustrating the UPIT structure.

Referring to FIG. 2, an example diagram 200 illustrating the UPIT structure is shown. UPIT is a snapshot technology developed by VMWare, Inc., which provides native snapshot capability. UPIT is integrated with VSAN object storage.

In particular, UPIT uses the B+ tree data structure to keep track of changes. There is one writable snapshot 204 called "running point." The B+ tree persistent data structure is used to manage logical object addresses, where every leaf of a tree points to a physical block in a VSAN object 203. B+ tree parts (i.e., subtrees) may be shared between several B+ trees (i.e., between several tree roots). For example, as shown in FIG. 2, trees S1 201 and S2 202 share a subtree. Snapshots correspond to tree roots, and taking a snapshot is accomplished by creating a new root point at the current running point tree 204.

When a write to a specific address is requested, the corresponding B+ tree leaf is found, and data in the physical address is overwritten only if the leaf belongs to the running point tree; otherwise, the new data is written to a newly allocated block inside the VSAN object.

In addition to conventional Input/Output (I/O) interfaces, UPIT also provides GetAllocated and GetDiff interfaces. In particular, the GetAllocated interface returns all regions in the VSAN object that are allocated in a specific snapshot. From the UPIT internals perspective, GetAllocated returns all the intervals that appear in the B+ tree corresponding to the snapshot. The GetDiff interface returns all regions in the VSAN object that are different between two particular snapshots. From the UPIT internals perspective, GetDiff compares the B+ trees corresponding to the two snapshots, and returns all the leaves that are different between the two trees.

Figure 3:
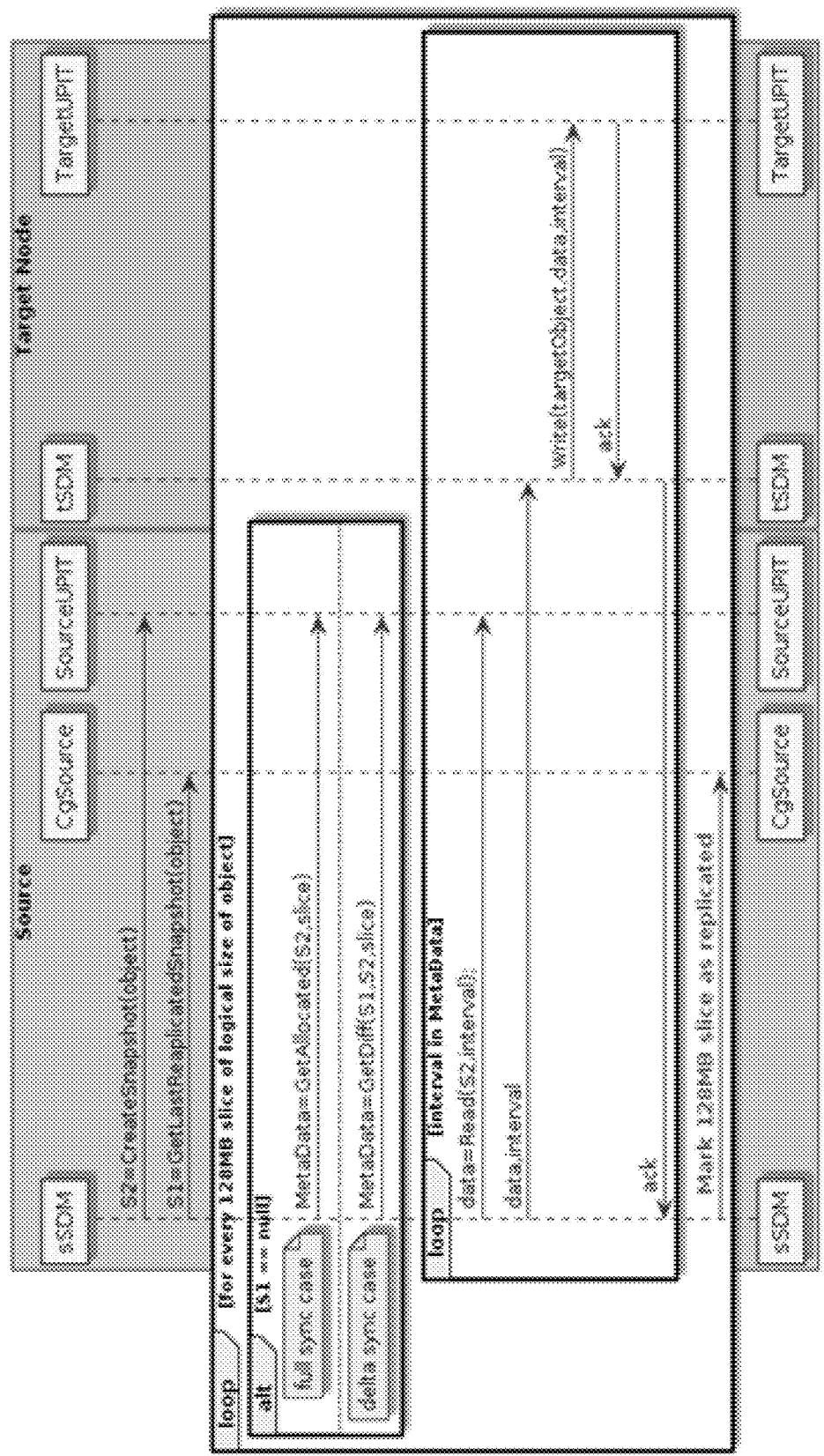
FIG. 3 is an example diagram illustrating a process for VSAN object replication according to one embodiment.

Referring to FIG. 3, an example diagram 300 illustrating a process for VSAN object replication according to one embodiment is shown. A VSAN remote replication service named "SDM" replicates VSAN objects to another VSAN cluster. For every CG, a database name CgSource is utilized to save metadata related to the CG. As shown in FIG. 3, the process comprises determining the B+ trees of the relevant snapshots, determining the VSAN object regions that need to be replicated using either the GetAllocated or GetDiff interface, and replicating the regions to the target VSAN cluster. The replication is performed in units of 128 Megabytes (MB) of data called slices. The size of a slice does not limit the disclosure. Furthermore, it should be appreciated that each slice may comprise one or more blocks in the VSAN object. In one embodiment, a plurality of VSAN objects and/or a plurality of slices may be replicated in parallel.

In one embodiment, in case of an interruption to the replication before its completion (e.g., a disaster), the replicated slices are not be replicated again when the replication is restarted, and the process of replication simply proceeds from the point of interruption. This is achieved by marking a slice as replicated as soon as the replication of the slice is completed. A persistent data structure used for marking the slices may be referred to as progress data. A more detailed description of the technique will be provided below.

In one embodiment, the UPIT B+ tree structure is utilized to store progress information. Dedicated UPIT snapshot trees for the VSAN object are created for the replication service. In other words, these snapshots should be accessible only to the replication service, and not to any other component of the system. Preferably, these dedicated snapshots are deleted as soon as they are no longer needed. After a region of the snapshot is replicated successfully, and the corresponding progress data saved, the region will never be replicated again.

Figure 4A:
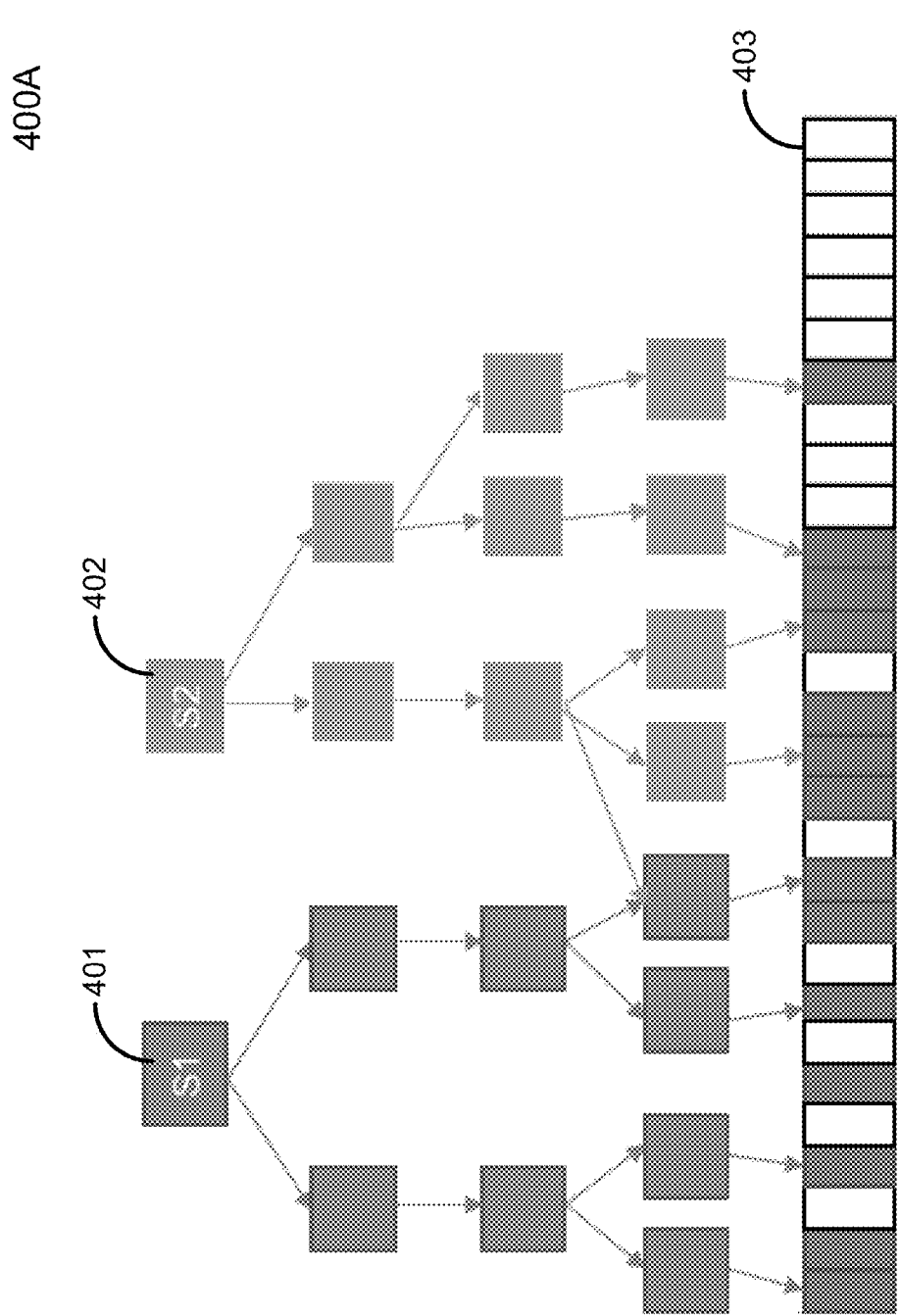
FIGS. 4A-D are diagrams illustrating an example method for recording replication progress information in UPIT snapshot B+ trees according to one embodiment.

Referring to FIGS. 4A-D, diagrams 400A-D illustrating an example method for recording replication progress information in UPIT snapshot B+ trees according to one embodiment are shown. Referring to FIG. 4A, a B+ tree S1 401 corresponds to a snapshot that was replicated in a previous replication cycle. A differential replication of a snapshot corresponding to the B+ tree S2 402 is to be performed. In other words, only data on the VSAN object 403 that are different between the two snapshots are to be replicated.

As described above, performing the differential replication comprises determining the regions in the VSAN object that are different between the two snapshots using the GetDiff interface.

Figure 4B:
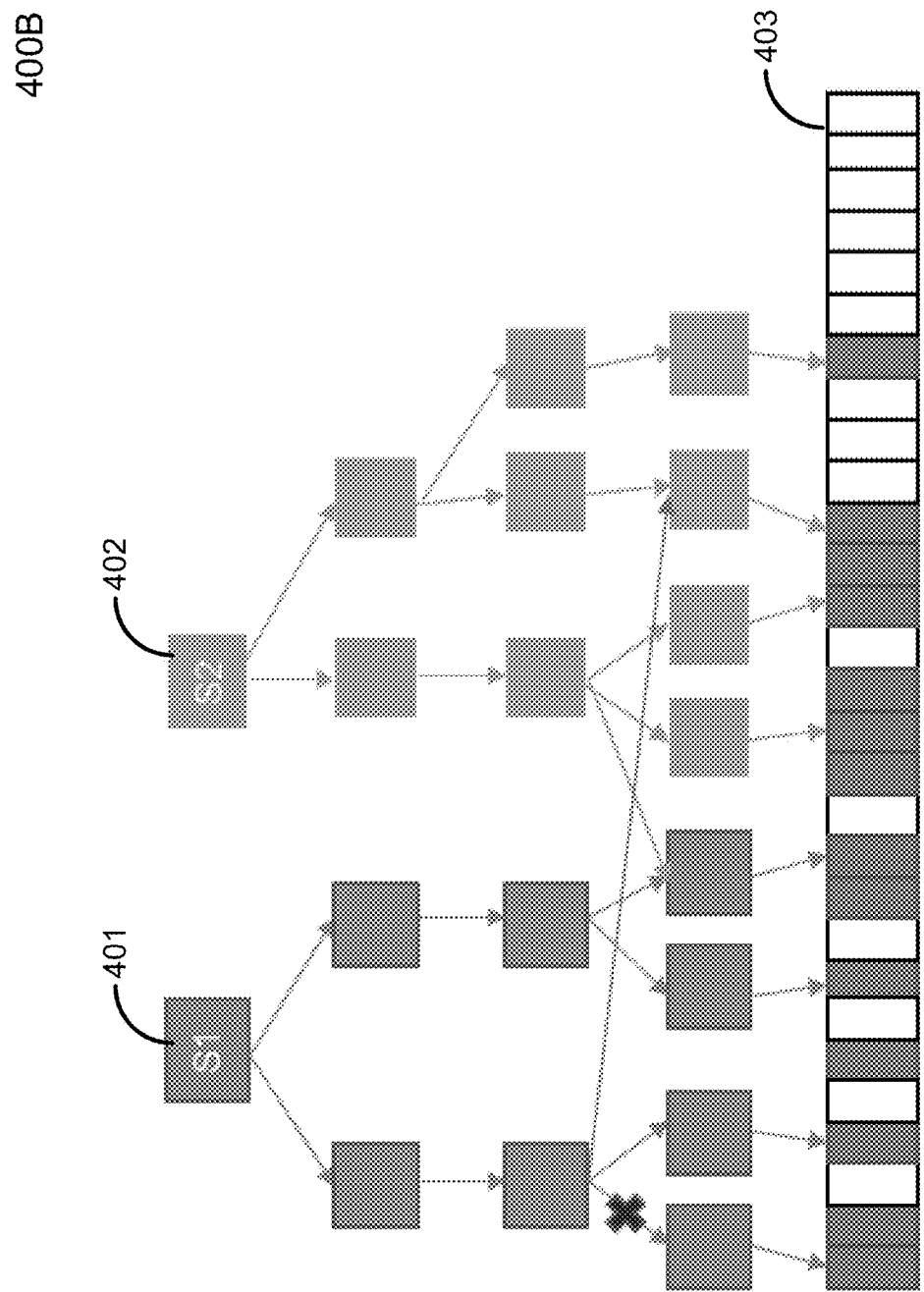

Referring to FIG. 4B, once the replication of a slice is completed, all of one or more nodes in the B+ tree S1 401 that correspond only to the replicated blocks (i.e., the nodes that do not have any descendant that points to a block that has not been replicated) are deleted or orphaned, and a tree merging operation (i.e., MergeTree) is performed on the B+ trees S1 401 and S2 402. As a result of the merger, the non-leaf nodes in the B+ trees S1 401 that have lost all descendants after the node orphaning now point to corresponding nodes of the B+ trees S2 402.

Figure 4C:
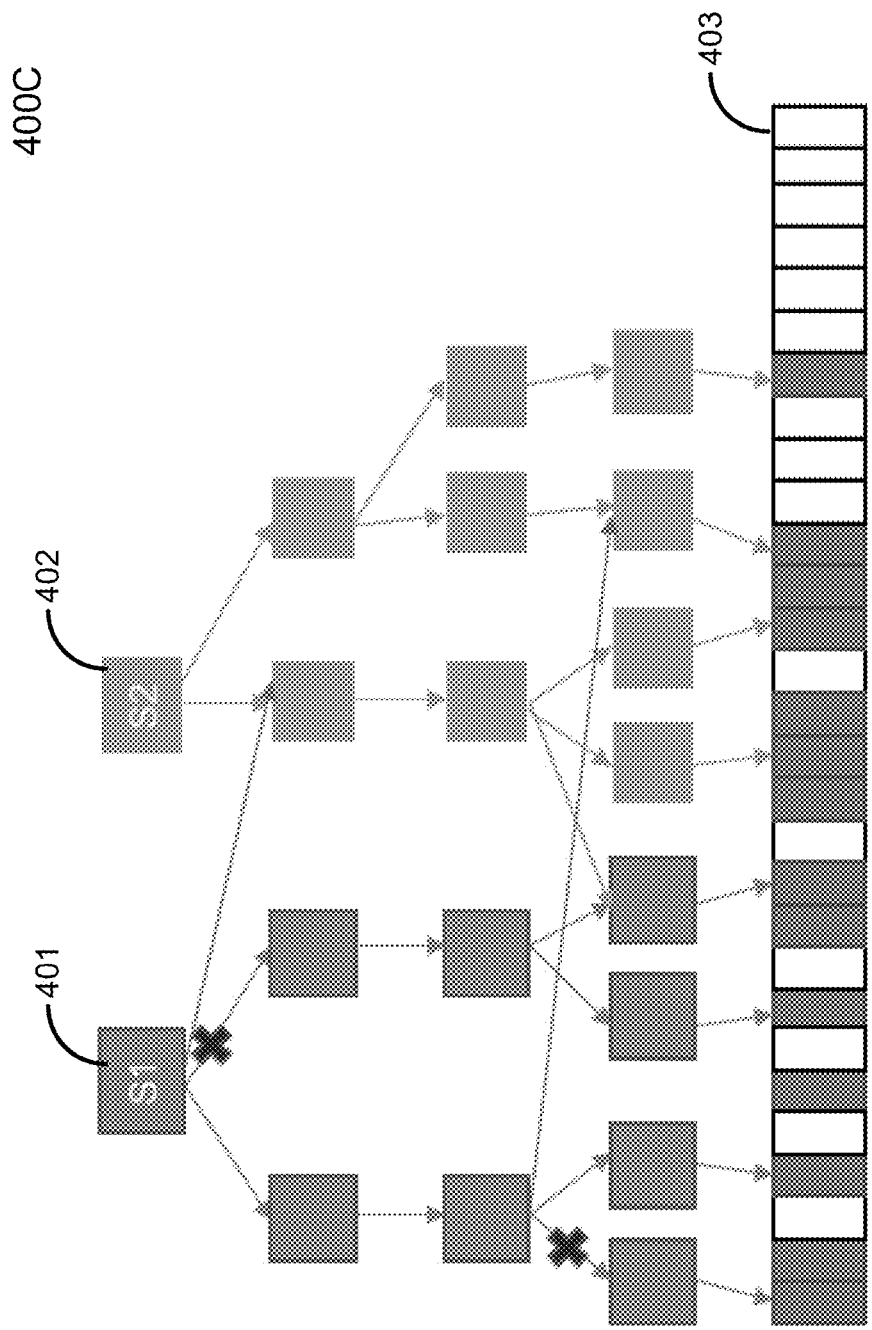
Figure 4D:
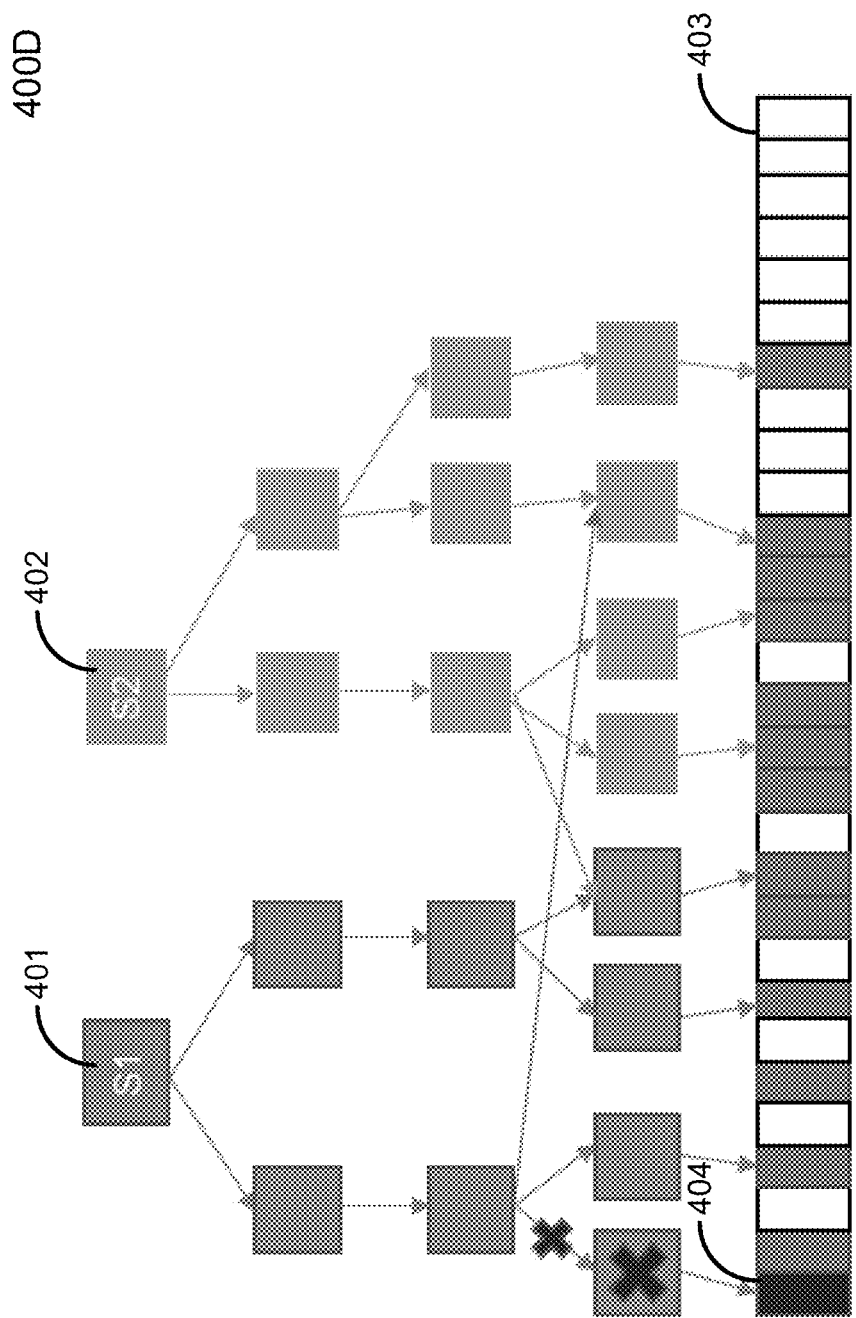

FIG. 4C illustrates the resultant B+ trees S1 401 and S2 402 after the completion of the replication of the next slice. FIG. 4D illustrates VSAN object space recycling. If any block in the VSAN object 403 is no longer pointed to by any snapshot after a tree merger (e.g., block 404), it can be deallocated and recycled.

Therefore, the B+ tree S1 401 is updated as the replication progresses. If the replication is interrupted, upon the resumption of the replication, the regions in the VSAN object 403 that are different between the two snapshots corresponding to B+ trees S1 401 and S2 402 are again determined using the GetDiff interface. However, the blocks that have already been replicated will not be included in the result of the determination. In other words, the progress data has been recorded in the updated B+ tree S1 401.

In another embodiment, to perform a full replication of the snapshot corresponding to the B+ tree S2, the replication service creates a UPIT B+ tree S1 that corresponds to a fully unallocated VSAN object (i.e., a B+ tree with only a root node) at the beginning of the replication. Then the same operations as described above can be performed to record progress data in the B+ tree S1 during the replication process.

Figure 5:
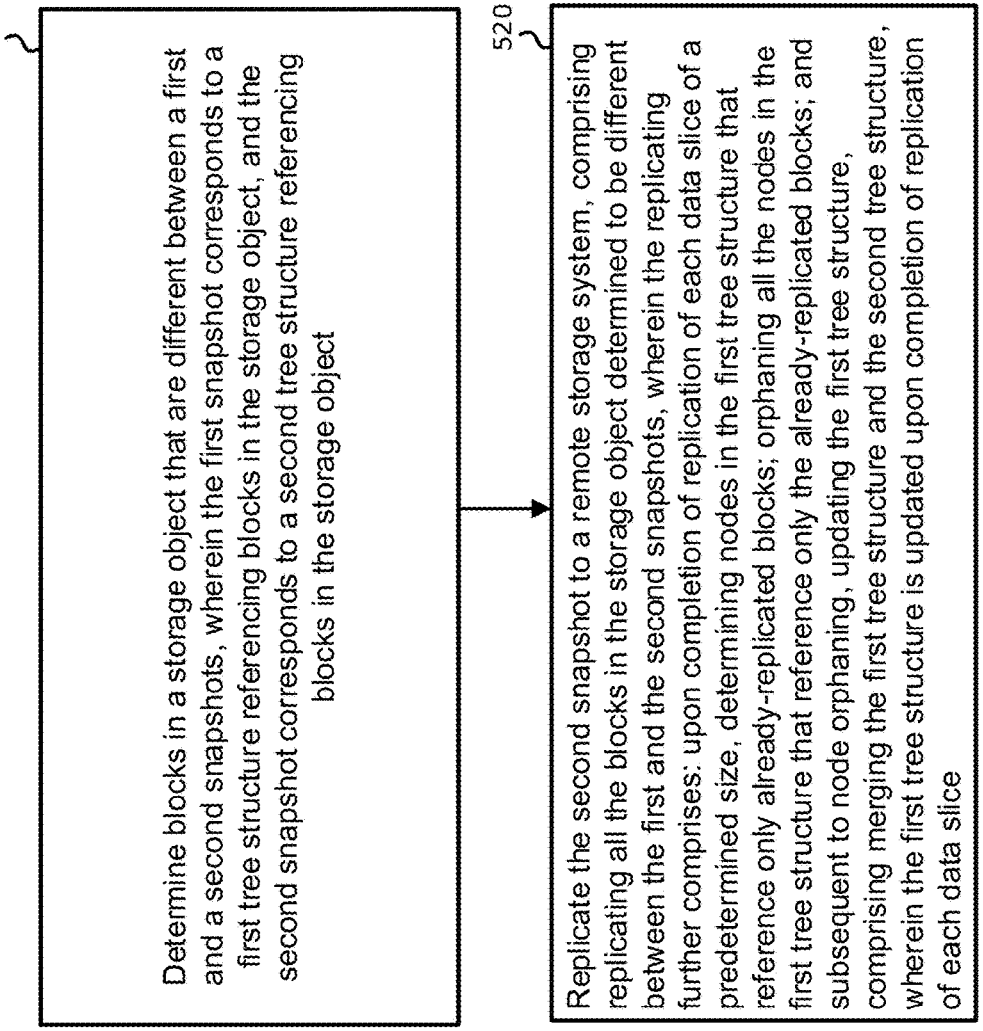
FIG. 5 is a flow diagram illustrating a process of according to one embodiment of the invention.

FIG. 5 is a flow diagram illustrating a process of 500 according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by processor 1501 of FIG. 6. Referring to FIG. 5, at block 510, blocks in a storage object that are different between a first and a second snapshots are determined, wherein the first snapshot corresponds to a first tree structure referencing blocks in the storage object, and the second snapshot corresponds to a second tree structure referencing blocks in the storage object. At block 520, the second snapshot is replicated to a remote storage system, which comprises replicating all the blocks in the storage object determined to be different between the first and the second snapshots, wherein the replicating further comprises: upon completion of replication of each data slice of a predetermined size, determining nodes in the first tree structure that reference only already-replicated blocks; orphaning all the nodes in the first tree structure that reference only the already-replicated blocks; and subsequent to node orphaning, updating the first tree structure, comprising merging the first tree structure and the second tree structure, wherein the first tree structure is updated upon completion of replication of each data slice.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, embodiments of the disclosure simplify the management of progress data for VSAN DP remote protection service and as a result, may simplify VSAN DP persistency service requirements. The technique can be adapted for data protection of other storage systems (e.g., XtremIO, Trident, PowerMax, etc.) and filesystems that use B+ tree-based snapshot technology.

Figure 6:
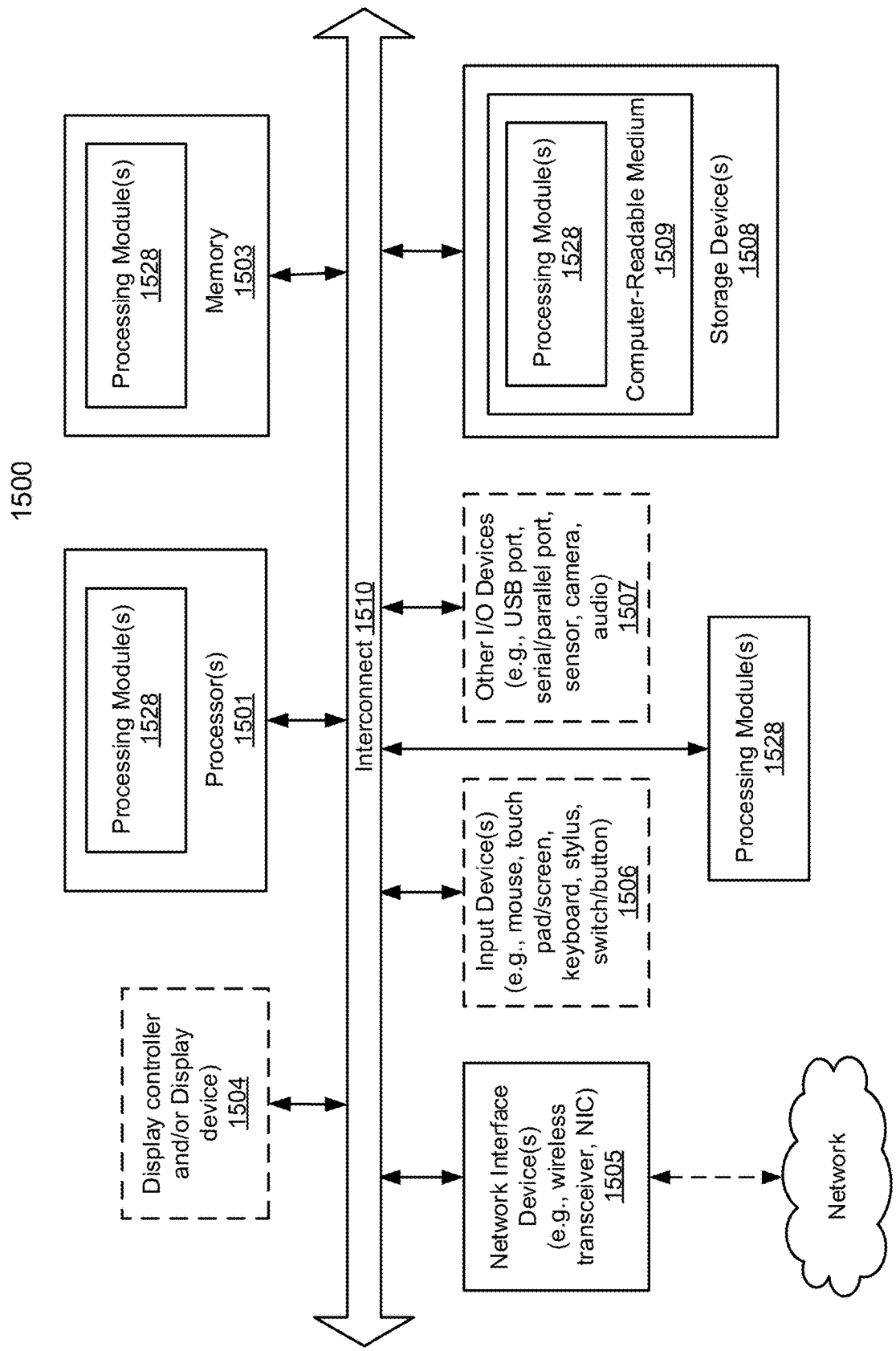
FIG. 6 is a block diagram illustrating a data processing system according to one embodiment.

FIG. 6 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a replication logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
determining blocks in a storage object that are different between a first and a second snapshots, wherein the first snapshot corresponds to a first tree structure referencing first blocks in the storage object, and the second snapshot corresponds to a second tree structure referencing second blocks in the storage object; and
replicating the second snapshot to a remote storage system, comprising replicating all the blocks in the storage object determined to be different between the first and the second snapshots,
wherein the replicating further comprises: upon completion of replication of each data slice of a predetermined size, determining nodes in the first tree structure that reference only already-replicated blocks; orphaning all the nodes in the first tree structure that reference only the already-replicated blocks; and subsequent to node orphaning, updating the first tree structure, comprising merging the first tree structure and the second tree structure, wherein the first tree structure is updated upon completion of replication of each data slice.

2. The computer-implemented method of claim 1, further comprising:
subsequent to an interruption to the replicating, resuming the replicating, wherein resuming the replicating further comprises:
determining blocks in the storage object that are different between an updated first snapshot and the second snapshot, the updated first snapshot corresponding to an updated first tree structure; and
replicating all the blocks in the storage object determined to be different between the updated first snapshot and the second snapshot, wherein the first tree structure is updated upon completion of replication of each data slice.

3. The computer-implemented method of claim 1, wherein the first and second tree structures are Universal Point in Time (UPIT) B+ trees.

4. The computer-implemented method of claim 1, wherein the first snapshot was replicated in a previous replication cycle.

5. The computer-implemented method of claim 1, wherein the first snapshot corresponds to a fully unallocated storage object.

6. The computer-implemented method of claim 1, wherein the storage object is a Virtual Storage Area Network (VSAN) object, and the remote storage system is a remote VSAN cluster.

7. The computer-implemented method of claim 1, further comprising deallocating and recycling all blocks in the storage object that are no longer referenced by any tree structure.

8. A non-transitory machine-readable medium having instructions stored therein, which when executed by a processor, cause the processor to perform data replication operations, the operations comprising:
determining blocks in a storage object that are different between a first and a second snapshots, wherein the first snapshot corresponds to a first tree structure referencing first blocks in the storage object, and the second snapshot corresponds to a second tree structure referencing second blocks in the storage object; and
replicating the second snapshot to a remote storage system, comprising replicating all the blocks in the storage object determined to be different between the first and the second snapshots,
wherein the replicating further comprises: upon completion of replication of each data slice of a predetermined size, determining nodes in the first tree structure that reference only already-replicated blocks; orphaning all the nodes in the first tree structure that reference only the already-replicated blocks; and subsequent to node orphaning, updating the first tree structure, comprising merging the first tree structure and the second tree structure, wherein the first tree structure is updated upon completion of replication of each data slice.

9. The non-transitory machine-readable medium of claim 8, the operations further comprising:
subsequent to an interruption to the replicating, resuming the replicating, wherein resuming the replicating further comprises:
determining blocks in the storage object that are different between an updated first snapshot and the second snapshot, the updated first snapshot corresponding to an updated first tree structure; and
replicating all the blocks in the storage object determined to be different between the updated first snapshot and the second snapshot, wherein the first tree structure is updated upon completion of replication of each data slice.

10. The non-transitory machine-readable medium of claim 8, wherein the first and second tree structures are Universal Point in Time (UPIT) B+ trees.

11. The non-transitory machine-readable medium of claim 8, wherein the first snapshot was replicated in a previous replication cycle.

12. The non-transitory machine-readable medium of claim 8, wherein the first snapshot corresponds to a fully unallocated storage object.

13. The non-transitory machine-readable medium of claim 8, wherein the storage object is a Virtual Storage Area Network (VSAN) object, and the remote storage system is a remote VSAN cluster.

14. The non-transitory machine-readable medium of claim 8, the operations further comprising deallocating and recycling all blocks in the storage object that are no longer referenced by any tree structure.

15. A data processing system, comprising:
a processor; and
a memory coupled to the processor to store instructions, which when executed by the processor, cause the processor to perform data replication operations, the operations including:
determining blocks in a storage object that are different between a first and a second snapshots, wherein the first snapshot corresponds to a first tree structure referencing first blocks in the storage object, and the second snapshot corresponds to a second tree structure referencing second blocks in the storage object; and
replicating the second snapshot to a remote storage system, comprising replicating all the blocks in the storage object determined to be different between the first and the second snapshots,
wherein the replicating further comprises: upon completion of replication of each data slice of a predetermined size, determining nodes in the first tree structure that reference only already-replicated blocks; orphaning all the nodes in the first tree structure that reference only the already-replicated blocks; and subsequent to node orphaning, updating the first tree structure, comprising merging the first tree structure and the second tree structure, wherein the first tree structure is updated upon completion of replication of each data slice.

16. The data processing system of claim 15, the operations further comprising:
   subsequent to an interruption to the replicating, resuming the replicating, wherein resuming the replicating further comprises:
   determining blocks in the storage object that are different between an updated first snapshot and the second snapshot, the updated first snapshot corresponding to an updated first tree structure; and
   replicating all the blocks in the storage object determined to be different between the updated first snapshot and the second snapshot, wherein the first tree structure is updated upon completion of replication of each data slice.

17. The data processing system of claim 15, wherein the first and second tree structures are Universal Point in Time (UPIT) B+ trees.

18. The data processing system of claim 15, wherein the first snapshot was replicated in a previous replication cycle.

19. The data processing system of claim 15, wherein the first snapshot corresponds to a fully unallocated storage object.

20. The data processing system of claim 15, wherein the storage object is a Virtual Storage Area Network (VSAN) object, and the remote storage system is a remote VSAN cluster.

21. The data processing system of claim 15, the operations further comprising deallocating and recycling all blocks in the storage object that are no longer referenced by any tree structure.

* * * * *